United States Patent [19]

Matsuda et al.

[11] Patent Number: 5,313,543
[45] Date of Patent: May 17, 1994

[54] SECOND-HARMONIC GENERATION DEVICE AND METHOD OF PRODUCING THE SAME AND SECOND-HARMONIC GENERATION APPARATUS AND METHOD OF PRODUCING THE SAME

[75] Inventors: Kaoru Matsuda; Kazuhisa Yamamoto, both of Osaka; Makoto Kato, Nishinomiya, all of Japan

[73] Assignee: Matsushita Electric Industrial Co., Inc., Osaka, Japan

[21] Appl. No.: 7,881

[22] Filed: Jan. 22, 1993

[30] Foreign Application Priority Data

Jan. 22, 1992 [JP] Japan ................................. 4-008981
Sep. 22, 1992 [JP] Japan ................................. 4-252588

[51] Int. Cl.$^5$ .................................................. G02F 1/37
[52] U.S. Cl. .................................. 385/122; 359/328; 359/332
[58] Field of Search ................. 385/122, 49; 359/326-332

[56] References Cited

U.S. PATENT DOCUMENTS

| | | | |
|---|---|---|---|
| 3,700,912 | 10/1972 | Glass et al. | 359/328 |
| 4,270,134 | 5/1981 | Takeda et al. | 385/49 |
| 4,538,278 | 8/1985 | Gergely | 359/328 X |
| 4,893,888 | 1/1990 | Okazaki et al. | 359/328 X |
| 4,896,933 | 1/1990 | Yano et al. | 358/122 X |
| 4,909,595 | 3/1990 | Okazaki et al. | 385/122 |
| 5,136,597 | 8/1992 | Nightingale | 359/328 X |

FOREIGN PATENT DOCUMENTS 61-189686 8/1986 Japan .

Primary Examiner—John D. Lee
Attorney, Agent, or Firm—Lowe, Price, LeBlanc & Becker

[57] ABSTRACT

A second harmonic generation device has a waveguide layer for generating and outputting a second harmonic wave ray in response to the laser light from a laser, wherein the returning of reflected laser light from the waveguide layer to a laser is prevented. The returning of reflected laser light is prevented: by inclining a normal of at least one of a first and second end facets of the waveguide layer from an optical axis of the laser; by providing an absorbing layer on the waveguide layer for absorbing waveguided laser light and for waveguiding the generated second harmonic wave ray; or by providing a second waveguide layer for waveguiding and outputting the generated second harmonic wave ray and for radiating the waveguided laser light. The absorbing layer is provided by a blue filter adhered or deposited on the top surface of the waveguide layer. The second waveguide layer is provided by making the second waveguide layer more narrow that the waveguide layer. A second harmonic generation apparatus includes the laser. Methods of producing these devices and apparatus are disclosed.

13 Claims, 16 Drawing Sheets

PERIODICALLY POLARIZATION DOMAIN-INVERTED LAYER — 22

LiTaO3 SUBSTRATE — 21

57 RESIST

BLUE FILTER — 58

ABSORBING LAYER — 55

SECOND-HARMONIC GENERATION DEVICE AND METHOD OF PRODUCING THE SAME AND SECOND-HARMONIC GENERATION APPARATUS AND METHOD OF PRODUCING THE SAME

BACKGROUND OF THE INVENTION

1. Field of the Invention

This invention relates to a second-harmonic generation device and a method of producing the same and a second-harmonic generation apparatus and a method of producing the same.

2. Description of the Prior Art

A waveguide type of a second-harmonic generation device is known. Such a harmonics generation device emits a second harmonics generated by waveguiding a fundamental wave incident thereto. There are a lot of researches for improving the efficiency of converting the fundamental wave to the second harmonics. However, there is a problem that a considerable amount of noise is developed in the laser light from a semiconductor laser which generates the fundamental wave incident to the second harmonics generation device. This is because the laser light from the semiconductor laser is reflected at an inlet of a waveguide of the second harmonic generation device and returns to the semiconductor laser. The reflected light induces the noise.

A second harmonic generation apparatus is known. Such a harmonics generation apparatus comprising a semiconductor laser for generating a fundamental wave ray, the second harmonics generation device mentioned above for generating a second harmonics ray, and an optical system for introducing the fundamental wave ray (laser light) to the second harmonics generation device. The second harmonics device generates the second harmonics in response to waveguiding a fundamental wave incident thereto. However, there is a problem that a considerable amount of noise is developed in the laser light from a semiconductor laser which generates the fundamental wave incident to the second harmonics generation device. This is because the laser light from the semiconductor laser is reflected at an inlet of a waveguide of the second harmonic generation device and returns to the semiconductor laser. The reflected light induces the noise.

In the prior art second harmonics generation device and second harmonics generation apparatus, there are a considerably large amount of noise in the fundamental wave ray because the noise is developed by the light reflected in the waveguide of the second harmonics generation device and the second harmonics generation apparatus returning to the semiconductor laser. Accordingly, the mode hopping phenomenon or other adverse phenomenon occurs, so that the second harmonics includes a considerably large amount of noise and its output is unstable.

SUMMARY OF THE INVENTION

The present invention has been developed in order to remove the above-described drawbacks inherent to the conventional.

According to the present invention there is provided a first second harmonic generation apparatus comprising: a laser for emitting laser light; and a second harmonic generation device having a waveguide layer for waveguiding the laser light incident to a first end facet of the waveguide layer and for generating and outputting a second harmonic wave ray in response to the laser light, the waveguide layer being coupled to a first end facet of the waveguide layer with a normal of at least one of the first end facet and a second end facet of the waveguide layer inclined from an optical axis of the laser.

According to the present invention there is also provided a second harmonic generation apparatus as mentioned above, wherein the first end facet is perpendicular to an optical axis of the waveguide layer which is inclined from an optical axis of the laser by a predetermined angle.

According to the present invention there is further provided a second harmonic generation apparatus as the first second harmonic generation apparatus, wherein the normal inclines from the optical axis of the layer and an optical axis of the waveguide layer agrees with the optical axis of the laser.

According to the present invention there is provided a second harmonic generation device comprising: a substrate; a waveguide layer formed on the substrate for generating a second harmonic wave ray in response to a laser light incident to a first end facet of the waveguide layer; and absorbing layer formed on the waveguide layer near a second end facet of the waveguide layer for absorbing the laser light and for transmitting and waveguiding the second harmonic together with the waveguide layer.

According to the present invention there is also provided a method of producing a second harmonic generation device, the steps comprising: forming a periodically polarization domain-inverted layer (polarizing inverted layer) on a substrate made of dielectric non-linear substance, the periodically polarization domain-inverted layer extending in a direction; forming a waveguide layer along the direction, the waveguide layer waveguiding a fundamental wave ray three-dimensionally and for generating a second harmonic wave ray, the periodically polarization domain-inverted layer effecting a phase matching between the fundamental wave ray and the second harmonic wave ray therein; and spattering an optical filter to deposit the spattered optical filter on a portion of a top surface of the waveguide layer near an end of the waveguide to form an absorbing layer for absorbing the fundamental wave ray and for transmitting and waveguiding the second harmonic together with the waveguide layer.

According to the present invention there is further provided a method of producing a second harmonic generation apparatus, the steps comprising: forming a periodically polarization domain-inverted layer on a substrate made of dielectric non-linear substance, the periodically polarization domain-inverted layer extending in a direction; forming a waveguide layer along the direction, the waveguide layer waveguiding a fundamental wave ray three-dimensionally and for generating a second harmonic wave ray, the periodically polarization domain-inverted layer effecting a phase matching between the fundamental wave ray and the second harmonic wave ray therein; spattering an optical filter to deposit the spattered optical filter on a portion of a top surface of the waveguide layer near an end of the waveguide to form an absorbing layer for absorbing the fundamental wave ray and for transmitting and waveguiding the second harmonic together with the waveguide layer; and coupling the waveguide layer to a semiconductor laser for emitting the fundamental wave ray.

According to the present invention there is provided a second harmonic generation device comprising: a substrate; and a waveguide layer formed on the substrate having first and second portions wherein the first portion waveguides a fundamental wave ray incident thereto; generates a second harmonic wave ray in response to the fundamental wave ray; and waveguides the generated second harmonic wave ray and the second portions waveguides and outputs the generated second harmonic ray from the first portion and radiating the fundamental wave ray.

According to the present invention there is also provided a second harmonic generation apparatus comprising: a laser for emitting laser light; and a second harmonic generation device having a waveguide layer for generating and outputting a second harmonic wave ray in response to the laser light, the waveguide layer being coupled to a first end facet of the waveguide layer; wherein the returning of reflected laser light from the waveguide layer to the laser is prevented.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Prior to describing embodiments of this invention, ideas of this invention will be described.

The returning of laser light from a waveguide layer for generating a second harmonic ray is prevented: by inclining an incident facet of the waveguide which is perpendicular to the optical axis of the laser light; or by making the incident facet inclining from an optical axis of the waveguide layer, the optical axis of the waveguide layer agreeing with that of the laser light; by making the output facet inclining from the laser light, the optical axis of the waveguide layer agreeing with that of the laser light; by providing an absorbing layer for absorbing the laser light and for waveguiding the second harmonic wave ray; by providing a second waveguide layer following to the waveguide layer for only waveguiding the second harmonic wave ray and for radiating the waveguided laser light; or by combination of these ideas.

From the first to a ninth embodiment, a dielectric waveguide device having a periodically polarization domain-inverted layer (polarizing inverted layer) is formed as follows:

A Ta (tantalum) layer is formed on a LiTaO$_3$ substrate with a periodical pattern using ordinary photo-process and dry-etching process. A proton exchange is effected to the surface of the LiTaO$_3$ substrate having the Ta layer at 260° C. for thirty minutes to form proton exchanged layers at portions where the Ta layer is not formed. Then, a heating processing is carried out for one minutes at 550° C. to the work where the proton exchanged layers have been formed to form periodically polarization domain-inverted layers. Then, the Ta layer is removed by wet etching for two minutes with a solution of HF:HFN$_3$=1:1.

Then, the proton exchange is effected to the periodically polarization domain-inverted layer with a pyrophoshoric acid to form a waveguide layer. The dielectric waveguide device having the periodically polarization domain-inverted layer obtained comprises a waveguide layer 2 having 4 μm width, 2 μm depth, and 10 mm length. The periodically polarization domain-inverted layers are periodically formed at every 3.6 μm length and are formed to have a width of 2.1 μm and a depth of 1.6 μm. This processing will be described more specifically later.

Hereinbelow will be described a first embodiment of this invention.

Figure 1:
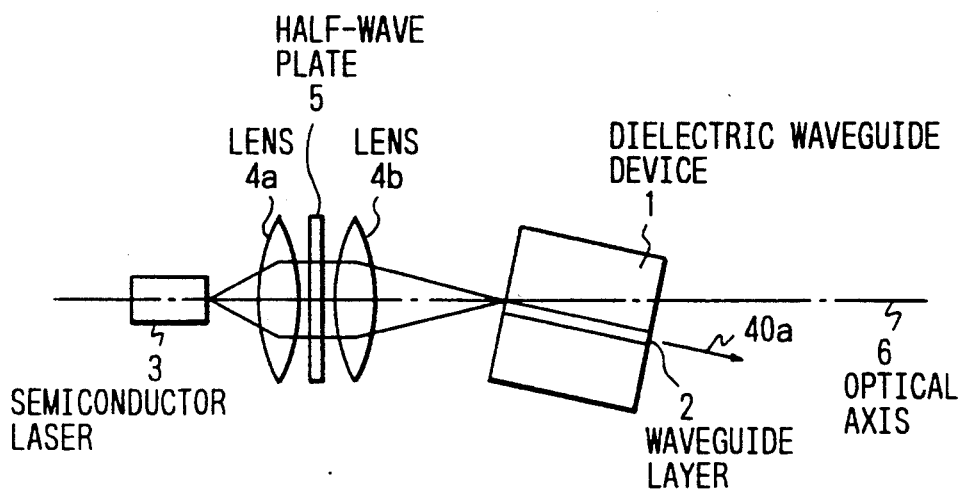
FIG. 1 is a plan view of the first embodiment of a second harmonics generation apparatus.

FIG. 1 is a plan view of the first embodiment of a second harmonics generation apparatus. A semiconductor laser 3 emits laser light having a wavelength of 860 nm and is used as a light source of a fundamental wave ray for generating a second harmonics. The laser light emitted from the semiconductor laser 3 is collected and made a parallel ray by a lens assembly 4a having numerical aperture NA of 0.5. That is, the lens assembly 4a collimates the laser light. The parallel ray (collimated ray) is transmitted through a half wave plate 5. The half-wave plate 5 converts a phase of the parallel ray by 90 degrees to obtain TM mode light. The TM mode light from the half-wave plate 5 is collected by a lens assembly 4b onto an inlet of the waveguide layer 2 of the dielectric waveguide device 1 to couple the laser light from the half-wave plate 5 to the waveguide layer 2. The dielectric waveguide device 1 is arranged such that a longitude direction of waveguide layer 2 is inclined about five degrees from an optical axis 6 of the semiconductor laser 3, the lens assembly 4a, the half-wave plate 5, and the lens assembly 4b along a top surface plane of the dielectric waveguide device 1. This incline arrangement of 5 degrees shows a little change in coupling efficiency of the semiconductor laser 3 to the waveguide layer 2 because a numerical aperture of the dielectric waveguide device 1 is large.

Figure 2:
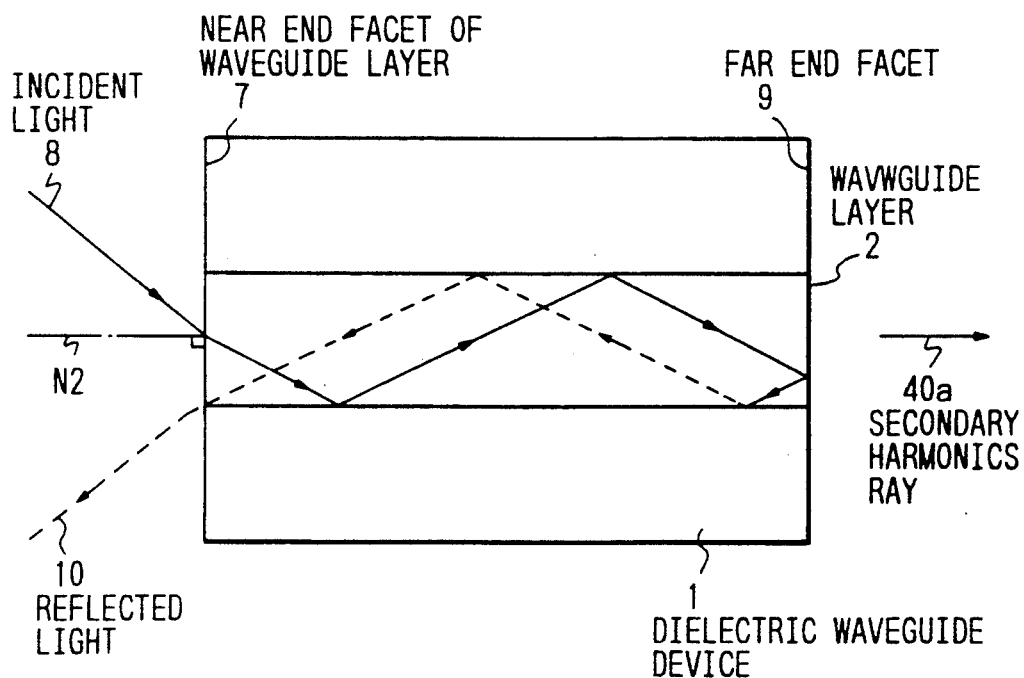
FIG. 2 is a schematic illustration approximately showing the condition of transmission of the fundamental wave through a waveguide layer of the first embodiment.

FIG. 2 is a schematic illustration approximately showing the condition of transmission of the fundamental wave through the waveguide layer 2 of the first embodiment where an incident angle to the waveguide layer 2 is emphasized. The TM mode light from the half-wave plate 5 through the lens assembly 4b, that is, the incident light 8 enters the waveguide layer 2 at a near end facet 7 and then propagates through the waveguide layer 2 with total reflections repeated. At a far end facet 9, the transmitted light is reflected and returns through a different path from the path before the reflection at the far end facet 9 because the incident light 8 has an incline angle of about five degrees from a normal N2 of the near end facet 7. The reflected light at the far end facet 9 also propagates through the waveguide layer 2 with total reflections repeated and then, exits at the near end facet 7 toward different direction from that of the incident light 8. Accordingly, the reflected light 10 does not returns to the semiconductor laser 3, so that noise in the fundamental wave and second harmonics is suppressed and an output of the second harmonics is stable. In the first embodiment, the second harmonics generation apparatus generates blue light of 21 mW as the second harmonics continuously when a light power to the dielectric waveguide device 1 is 135 mW which is obtained from the semiconductor laser 3 produces a fundamental wave of 860.3 nm with a temperature of the semiconductor laser 3 controlled to 20° C. The wavelength of the laser light from the semiconductor laser 3 is constant and no mode hopping occurs during the generation of the second harmonics.

Figure 3:
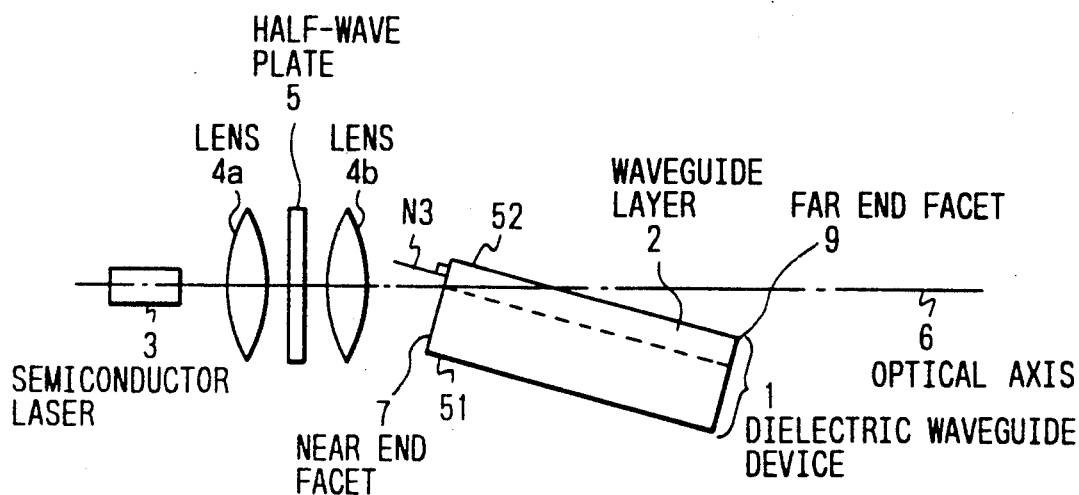
FIG. 3 is a side view of a second embodiment of a second harmonics generation apparatus.

FIG. 3 is a side view of a second embodiment of a second harmonics generation apparatus. A semiconductor laser 3 emits laser light having a wavelength of 860 nm and is used as a light source of a fundamental wave for generating a second harmonics. The laser light emitted from the semiconductor laser 3 is collected and made a parallel ray by a lens assembly 4a having numerical aperture NA of 0.5. The parallel ray is transmitted through a half wave plate 5. The half-wave plate 5 converts a phase of the parallel ray by 90 degrees to obtain TM mode light. The TM mode light from the half-wave plate 5 is collected by a lens assembly 4b onto an inlet of the waveguide layer 2 of the dielectric waveguide device 1 to couple the laser light from the half-wave plate 5 to the waveguide layer 2. The dielectric waveguide device 1 is arranged such that a longitude direction of waveguide layer 2, or a normal N3 of a near end facet 7, is inclined about eight degrees from an optical axis 6 of the semiconductor laser 3, the lens assembly 4a, the half-wave plate 5, and the lens assembly 4b along a plane of a side surface 51 of the dielectric waveguide device 1. That is, the dielectric waveguide device 1 is inclined with a top surface 52 of the waveguide layer disappear from the view from the semiconductor laser 3.

In this embodiment, light confinement in the waveguide layer 2 is effected by difference in the refractive index between the air and the waveguide layer 2 at the top surface of the waveguide layer 2 and between the LiTaO3 substrate and the waveguide layer 2 at the side surfaces and the bottom surface of the waveguide layer 2. Here, the difference of the refractive index at the top surface 52 of the waveguide layer 2 is large because the tope surface contacts with the air. Therefore, the coupling efficiency from the semiconductor laser 3 to the waveguide layer 2 does not change though the dielectric waveguide device 1 is more largely inclined from the optical axis 6 as shown in FIG. 3 than other directions. That is, the incident laser light is firstly reflected at the top surface 52 of the waveguide layer 2.

In the second embodiment, the second harmonics generation apparatus generates blue light of 21 mW as the second harmonics continuously when a light power to the dielectric waveguide device 1 is 135 mW which is obtained from the semiconductor laser 3 produces a fundamental wave ray of 860.4 nm with a temperature of the semiconductor laser 3 controlled to 22° C. The wavelength of the laser light from the semiconductor laser 3 is constant and no mode hopping occurs during the generation of the second harmonics.

Figure 4:
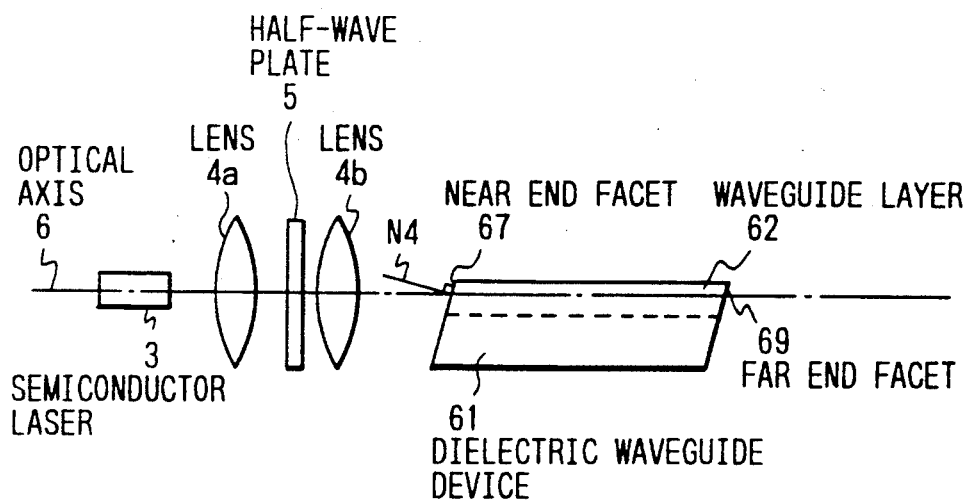
FIG. 4 is a side view of a third embodiment of a second harmonics generation apparatus.

FIG. 4 is a side view of a third embodiment of a second harmonics generation apparatus. A semiconductor laser 3 emits laser light having a wavelength of 860 nm and is used as a light source of a fundamental wave for generating a second harmonics. The laser light emitted from the semiconductor laser 3 is collected and made a parallel ray by a lens assembly 4a having numerical aperture NA of 0.5. The parallel ray is transmitted through a half wave plate 5. The half-wave plate 5 converts a phase of the parallel ray by 90 degrees to obtain TM mode light. The TM mode light from the half-wave plate 5 is collected by a lens assembly 4b onto an inlet of the waveguide layer 62 of the dielectric waveguide device 61 to couple the laser light from the half-wave plate 5 to the waveguide layer 2. The dielectric waveguide device 61 is arranged such that a longitude direction of waveguide layer 2 is agrees with an optical axis 6 of the semiconductor laser 3, the lens assembly 4a, the half-wave plate 5, and the lens assembly 4b. The dielectric waveguide device 61 is processed as follows:

Both of a near end facet 67 and a far end facet 69 of the dielectric waveguide 1 is polished with a diamond polishing liquid to have an inclined angle of about 6 degrees from the longitude direction of the waveguide layer 62 to a normal N4. That is, the side view of dielectric wave guide 61 looks like a parallel-ogram. During polishing the dielectric waveguide device 1 is covered with another substrate to protect the waveguide layer 62 and to prevent shear drop at both of the near end facet 67 and the far end facet 69.

In the third embodiment, as described using FIG. 2, the fundamental wave ray reflects at the far end facet 69 in accordance with a law of reflection, the reflected light advanced along the different path from the incident light. Accordingly, the reflected light does not returns to the semiconductor laser 3, so that noise in the fundamental wave ray and second harmonic ray is suppressed and an output of the second harmonics is stable. In the third embodiment, the second harmonics generation apparatus generates blue light of 22 mW as the second harmonics continuously when a light power to the dielectric waveguide device 61 is 135 mW which is obtained from the semiconductor laser 3 produces a fundamental wave ray with a temperature of the semiconductor laser 3 controlled to 20° C. The wavelength of the laser light from the semiconductor laser 3 is constant and no mode hopping occurs during the generation of the second harmonics.

Figure 5:
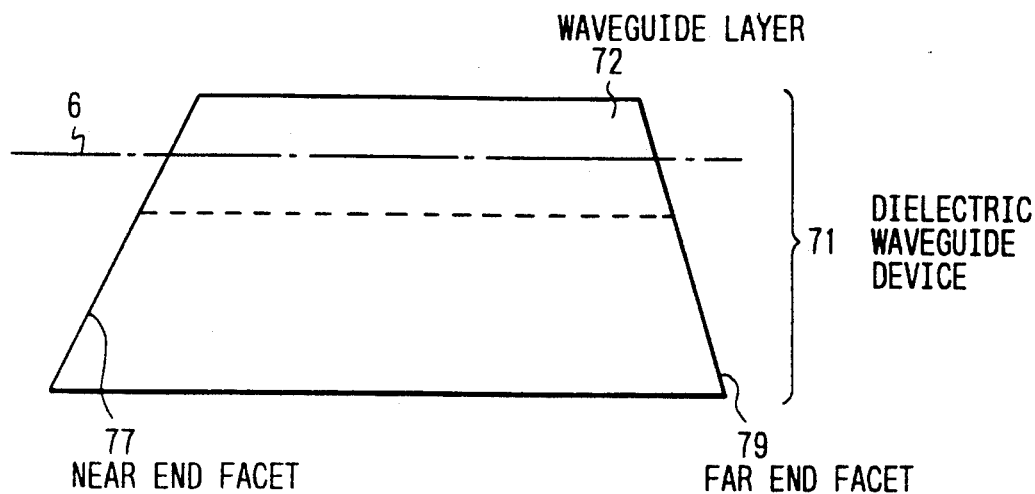
FIG. 5 is a side view of a dielectric waveguide of a second harmonics generation apparatus of a fourth embodiment.

FIG. 5 is a side view of a dielectric waveguide of a second harmonics generation apparatus of a fourth embodiment. The general structure of the second harmonics generation apparatus is the same as that of the third embodiment as shown in FIG. 4 except the structure of the dielectric waveguide. In FIG. 5, both of the near end facet 77 and the far end facet 79 are polished in the same manner as the third embodiment. However, inclined angles of both of the near end facet 77 and the far end facet 79 are different from each other. These inclined angle are selected from any angle such that the reflected light at the far end facet 79 does not returns to the semiconductor laser 3.

In the fourth embodiment, the second harmonics generation apparatus generates blue light as the second harmonics continuously stable.

Figure 6:
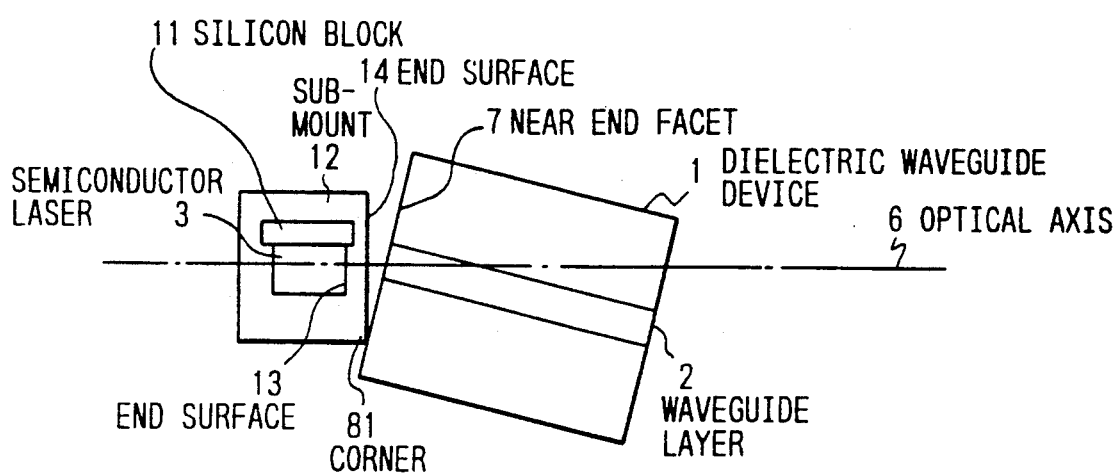
FIG. 6 is a plan view of a fifth embodiment of a second harmonics generation apparatus.

FIG. 6 is a plan view of a fifth embodiment of a second harmonics generation apparatus. A semiconductor laser 3 for emitting laser light of 860-nm band is mounted on a silicon block 11. The silicon block 11 is mounted on a sub-mount 12 made of silicon. The silicon block 11 is mounted such that an end surface 14 of the sub-mount 12 on the side of the dielectric waveguide device 1 projects from an end surface 13 of the semiconductor laser 3 on the side of the dielectric waveguide device 1 by approximately 10 μm by observing them with a microscope. The laser light emitted form the semiconductor laser 3 is of TM mode for the dielectric waveguide device 1. It is possible to directly couple the laser light to the inlet of the waveguide layer 2 because a near field pattern of the laser light has an ellipsoidal shape with its minor axis extending vertically and its major axis extending horizontally in the drawing of FIG. 6. The sub-mount 12 and the dielectric waveguide device 1 are mounted on a base (not shown). The position of the dielectric waveguide device 1 is adjusted three-dimensionally, that is, vertically, horizontally, and in the depth direction in the drawing of FIG. 6 to obtain a maximum coupling efficiency. Then, the dielectric waveguide device 1 is move toward the sub-mount 12 in this condition until the end facet 14 of the sub-mount 12 contacts with the near end facet 7. The inlet of the waveguide layer 2 does not contact with the end surface 14 of the dielectric waveguide device 1 because the position of the inlet of the waveguide layer 2 is sufficiently higher than the sub-mount 12 with respect to the base. Then, the dielectric waveguide device 1 is twisted around the corner 81 of the sub-mount 12 slightly with observing the longitudinal mode of the semiconductor laser 3. Then, the position of the dielectric waveguide device 1 is finely adjusted to have the inclination mentioned above to obtain a maximum coupling efficiency. In this embodiment, the mode hopping in the semiconductor laser 3 which is considered to be caused by the return light to the semiconductor laser 3 does not occur and an oscillation wavelength of the semiconductor laser 3 when the dielectric waveguide device 1 is arrange to have an incline angle approximately 6 degrees between the optical axis 6 and the longitude direction of the waveguide layer 2. Then, the dielectric waveguide device 1 is fixed in this condition. In the third embodiment, the second harmonic generation apparatus generates blue light of 20 mW as the second harmonics continuously when a light power to the dielectric waveguide device 1 is 137 mW which is obtained from the semiconductor laser 3 produces a fundamental wave with a temperature of the semiconductor laser 3 controlled to 18° C. The wavelength of the laser light from the semiconductor laser 3 is constant and no mode hopping occurs during the generation of the second harmonics.

Figure 7:
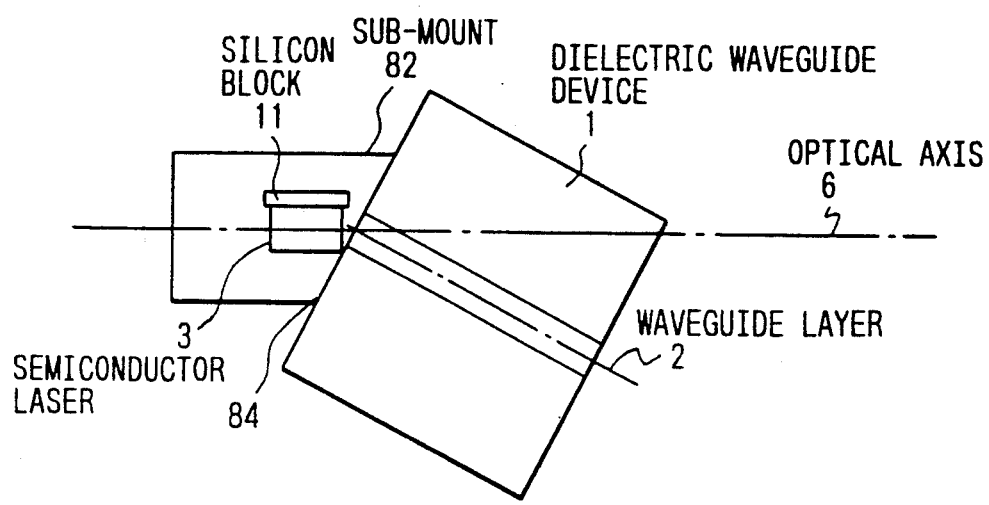
FIG. 7 is a plan view of a sixth embodiment of a second harmonics generation apparatus.

FIG. 7 is a plan view of a sixth embodiment of a second harmonics generation apparatus. A semiconductor laser 3 for emitting laser light of 860-nm band is mounted on a silicon block 11. The silicon block 11 is mounted on a sub-mount 82 made of silicon. The silicon block 11 is mounted such that an end surface 84 of the sub-mount 82 on the side of the dielectric waveguide device 1 projects from an end facet of the semiconductor laser 3 on the side of the dielectric waveguide device 1 by approximately 10 μm by observing them with a microscope. The end surface 84 of the sub-mount 82 is inclined by approximately five degrees from the vertical of the optical axis 6 in the drawing of FIG. 7. The laser light emitted form the semiconductor laser 3 is of TM mode for the dielectric waveguide device 1. It is possible to directly couple the laser light to the inlet of the waveguide layer 2 because a near field pattern of the laser light has an ellipsoidal shape with its minor axis extending vertically and its major axis extending horizontally in the drawing of FIG. 7. The sub-mount 82 and the dielectric waveguide device 1 are mounted on a base (not shown). The position of the dielectric waveguide device 1 is adjusted along the end surface 84 in the substantially vertical direction and depth direction of the drawing of FIG. 7 to obtain a maximum coupling efficiency. Then, the dielectric waveguide device 1 is fixed in this condition. The inlet of the waveguide layer 2 does not contact with the end surface 84 of the dielectric waveguide device 1 because the position of the inlet of the waveguide layer 2 is sufficiently higher than the sub-mount 82 with respect to the base. In the sixth embodiment, the second harmonic generation apparatus generates blue light of 20 mW as the second harmonics continuously when a light power to the dielectric waveguide device 1 is 138 mW which is obtained from the semiconductor laser 3 produces a fundamental wave with a temperature of the semiconductor laser 3 controlled to 20° C. The wavelength of the laser light from the semiconductor laser 3 is constant and no mode hopping occurs during the generation of the second harmonics. The process of coupling of the semiconductor laser 3 to the dielectric waveguide device 1 is easier than the fifth embodiment.

Figure 8:
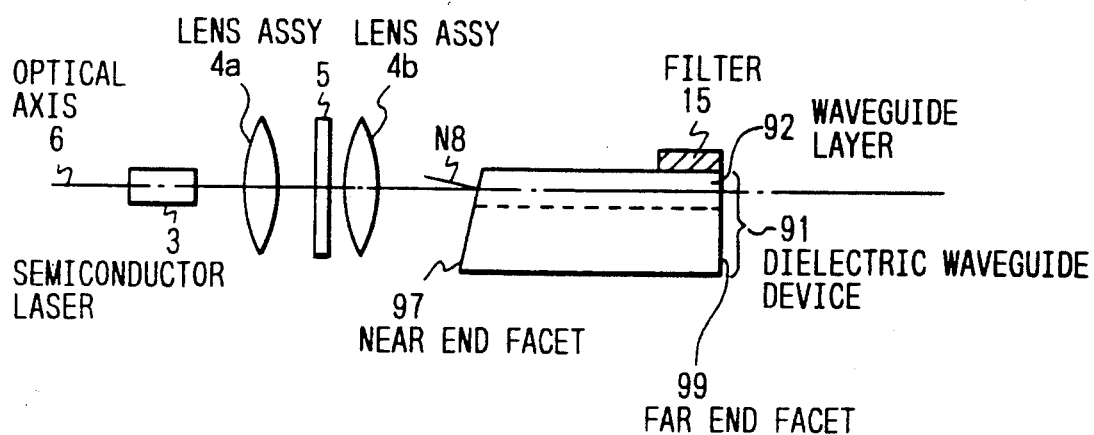
FIG. 8 is a side view of a seventh embodiment of a second harmonics generation apparatus.

FIG. 8 is a side view of a seventh embodiment of a second harmonics generation apparatus. A semiconductor laser 3 emits laser light having a wavelength of 860-nm band and is used as a light source of a fundamental wave for generating a second harmonics. The laser light emitted from the semiconductor laser 3 is collected and made a parallel ray by a lens assembly 4a having numerical aperture NA of 0.5. The parallel ray is transmitted through a half wave plate 5. The half-wave plate 5 converts a phase of the parallel ray by 90 degrees to obtain TM mode light. The TM mode light from the half-wave plate 5 is collected by a lens assembly 4b onto an inlet of the waveguide layer 92 of the dielectric waveguide device 91 to couple the laser light from the half-wave plate 5 to the waveguide layer 92. The dielectric waveguide device 91 is arranged such that a longitude direction of waveguide layer 92 is agrees with an optical axis 6 of the semiconductor laser 3, the lens assembly 4a, the half-wave plate 5, and the lens assembly 4b. The dielectric waveguide device 91 is processed as follows:

Both of a near end facet 97 of the dielectric waveguide device 91 is polished with a diamond polishing liquid to have an inclined angle of about five degrees from the moral N8 of the longitude direction of the waveguide layer 92. That is, the side view of dielectric wave guide 91 looks like a trapezoid. This prevents returning of the light from waveguide layer 92 to the semiconductor laser 3. Further, a blue filter 15 (HOYA B-460) is adhered as a cladding layer such as to cover the top surface of the waveguide layer 92 from the far end facet by approximately 1 mm to absorb the fundamental wave ray. This blue filter absorbs light of 860-nm band but its transmittance of light having 430-nm band is approximately 85%. That is, the fundamental wave ray and the second harmonic ray enters the blue filter 15 from the waveguide layer 92 without total reflection and are reflected at the top surface of the blue filter 15. Therefore, the second harmonic wave ray is outputted. On the other hand, the fundamental wave ray is absorbed by the blue filter 15. In the seventh embodiment, the second harmonics generation apparatus generates blue light of 13 mW as the second harmonics continuously when a light power to the dielectric waveguide device 91 is 138 mW which is obtained from the semiconductor laser 3 produces a fundamental wave. The wavelength of the laser light from the semiconductor laser 3 is constant and no mode hopping occurs during the generation of the second harmonics.

Figure 9:
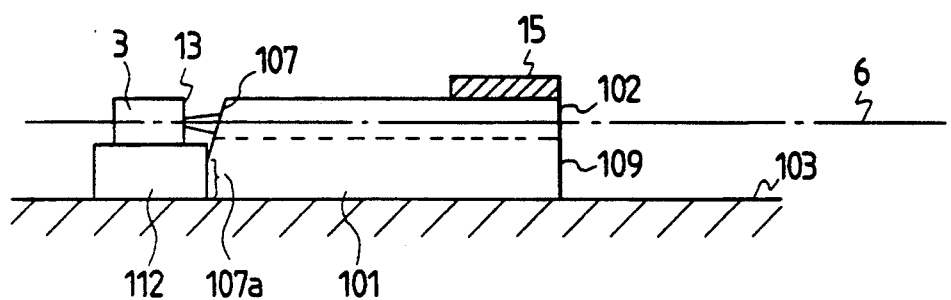
FIG. 9 is a side view of an eighth embodiment of a second harmonics generation apparatus.

FIG. 9 is a side view of an eighth embodiment of a second harmonics generation apparatus. In the eighth embodiment, laser light from the semiconductor laser 3 is directly coupled to a dielectric waveguide device and the returning of the fundamental wave ray from a waveguide layer 102 is prevented. The semiconductor laser 3 is mounted on a sub-mount 112. The sub-mount 112 is mounted on a base 103. A dielectric device 101 is mounted on the base 103. The sub-mount 112 projects from the side surface of the semiconductor laser 3 on the side surface of the dielectric waveguide 101 by 10 μm. The semiconductor laser 3 is coupled to the dielectric waveguide device 101 with the sub-mount 112 contacted with a portion 107a of a near end surface 107 of the dielectric waveguide device 101. The near end facet 107 is polished to have an inclined angle of about 6 degrees from a vertical of an optical axis of the semiconductor laser 3 and the dielectric waveguide device 101. The portion 107a of the near end facet 107 is further polished to have a vertical plane for the contacting of the sub-mount 112 with the dielectric waveguide device 101. A blue filter 15 (HOYA B-460) is adhered as a cladding layer such as to cover the top surface of the waveguide layer 102 from the far end facet 109 by approximately 1 mm to absorb the fundamental wave ray. This blue filter absorbs light of 860-nm band but its transmittance of light having 430-nm band is approximately 85%. That is, the blue light is transmitted and reflects in the blue filter 15. On the other hand, the fundamental wave ray is absorbed by the blue filter 15. More specifically, the fundamental wave ray and the second harmonic wave ray enter the blue filter 15 because difference in the refractive index is decreased compared with the air. The blue filter 15 absorbs the fundamental wave ray but transmits the second harmonic wave ray and reflects it at its top surface. Therefore, the second harmonic wave ray is waveguided by the blue filter 15 and the waveguide layer 2.

In the seventh embodiment, the second harmonics generation apparatus generates blue light of 14 mW as the second harmonics continuously when a light power to the dielectric waveguide device 101 is 138 mW which is obtained from the semiconductor laser 3 produces a fundamental wave. The wavelength of the laser light from the semiconductor laser 3 is constant and no mode hopping occurs during the generation of the second harmonics.

Figure 10:
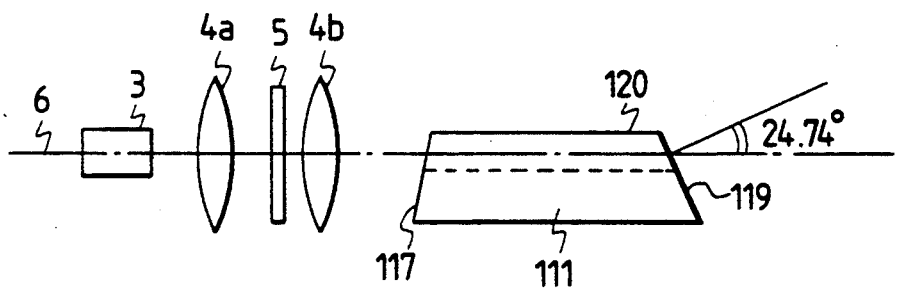
FIG. 10 is a side view of a ninth embodiment of a second harmonics generation apparatus.

FIG. 10 is a side view of a ninth embodiment of a second harmonics generation apparatus. In the ninth embodiment the returning of the fundamental wave is prevented by cutting a far end facet 119 of the semiconductor laser 111 to obtain a Brewster's angle with respect to TM mode light. A semiconductor laser 3 emits laser light having a wavelength of 860 nm and is used as a light source of a fundamental wave for generating a second harmonics. The laser light emitted from the semiconductor laser 3 is collected and made a parallel ray by a lens assembly 4a having numerical aperture NA of 0.5. The parallel ray is transmitted through a half wave plate 5. the half-wave plate 5 converts a phase of the parallel ray by 90 degrees to obtain TM mode light. The TM mode light from the half-wave plate 5 is collected by a lens assembly 4b onto an inlet of the waveguide layer 120 of the dielectric waveguide device 111 to couple the laser light from the half-wave plate 5 to the waveguide layer 120. The dielectric waveguide device 111 is arranged such that a longitude direction of waveguide layer 2 is agrees with an optical axis 6 of the semiconductor laser 3, the lens assembly 4a, the half-wave plate 5, and the lens assembly 4b. The dielectric waveguide device 111 is processed as follows:

A near end facet 117 and a far end facet 119 of the dielectric waveguide 1 are polished with a diamond polishing liquid to have inclined angles. The inclined angle of the far end facet 119 is 24. 74° to obtain a Brewster's angle to make a reflectivity of TM-mode light almost zero.

In the third embodiment, as described using FIG. 2, the fundamental wave ray reflects at the end facet 69 in accordance with a law of reflection, the reflected light advancing along the different path from the incident light. Accordingly, the reflected light does not returns to the semiconductor laser 3, so that noise in the fundamental wave and second harmonics is suppressed and an output of the second harmonics is stable. In the third embodiment, the second harmonics generation apparatus generates blue light of 22 mW as the second harmonics continuously when a light power to the dielectric waveguide device 1 is 135 mW which is obtained from the semiconductor laser 3 produces a fundamental wave (laser light) with a temperature of the semiconductor laser 3 controlled to 20° C. The wavelength of the laser light from the semiconductor laser 3 is constant and no mode hopping occurs during the generation of the second harmonics.

Figure 11:
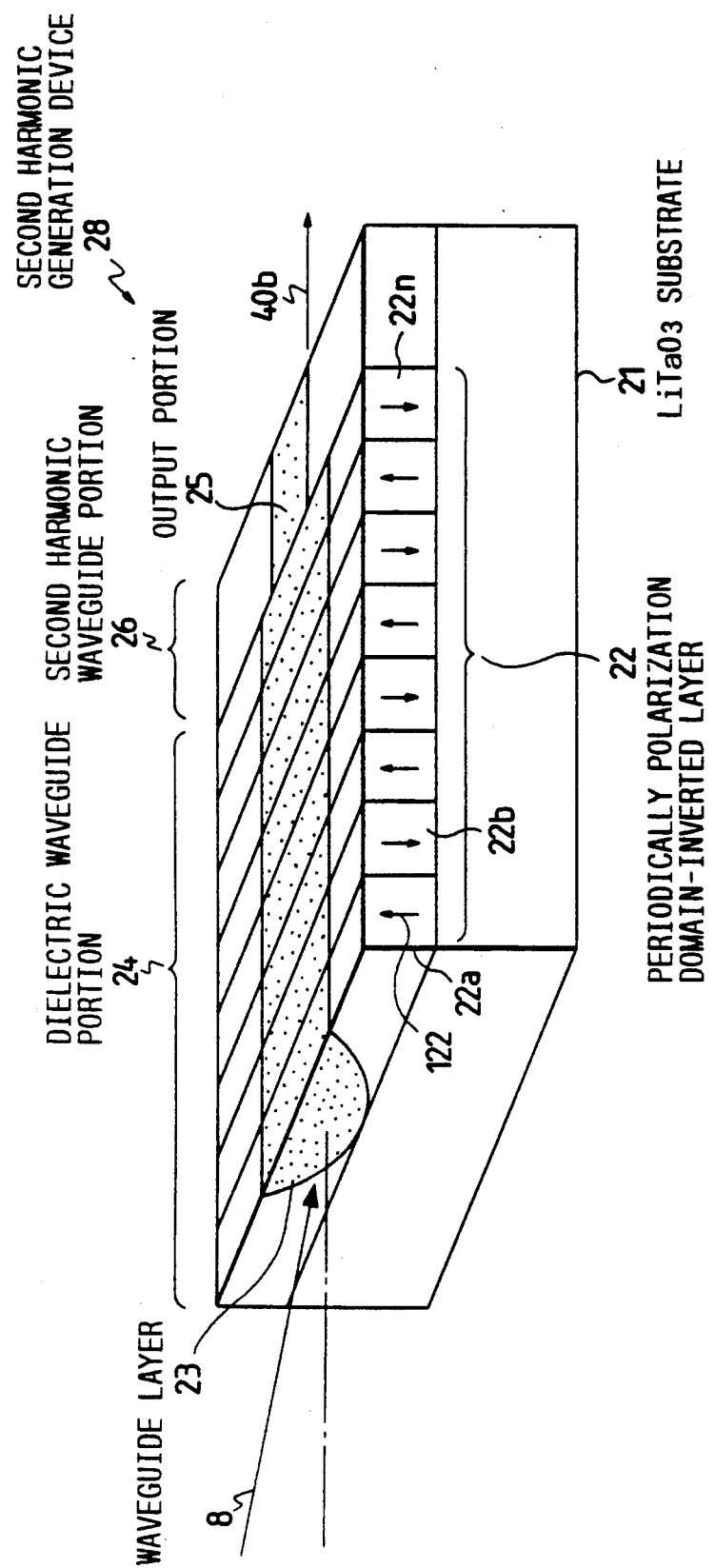
FIG. 11 is a perspective view of a second harmonic generation device of a tenth embodiment of the invention.

FIG. 11 is a perspective view of a second harmonic generation device (dielectric wave guide device) 28 of a tenth embodiment of the invention. The second harmonic generation device 28 of the tenth embodiment comprises the dielectric waveguide portion 24 for receiving and waveguiding a fundamental ray (laser light) 8 and for generating a second harmonic ray and a second harmonic wave guide portion 26 for receiving, waveguiding, and outputting the second harmonic ray.

The second harmonic generation device 28 is obtained by a processing as follows:

A Ta (tantalum) layer is formed on a LiTaO$_3$ substrate 21 with a periodical pattern, i.e. a stripes-pattern, using ordinary photoprocess and dry-etching process. A proton exchange is effected to the surface of the LiTaO$_3$ substrate 21 having the Ta layer at 260° C. for thirty minutes to form proton exchanged layers at portions where the Ta layer is not formed. Then, a heating processing is carried out for one minutes at 550° C. to the work where the proton exchanged layers have been formed to form periodically polarization domain-inverted layer 22. Then, the Ta layer is removed by wet etching for two minutes with a solution of HF:HFN$_3$=1:1. Here, the periodically polarization domain-inverted layer 22 is obtained. The periodically polarization domain-inverted layer 22 is formed on the LiTaO$_3$ substrate 21 with a stripes-pattern. That is, the periodically polarization domain-inverted layer 22 are periodically formed at every 3.6 $\mu$m length and are formed to have a width of 2.1 $\mu$m and a depth of 1.6 $\mu$m. Therefore, polarizing directions of respective blocks 22a to 22n (n is a natural number) alternate as shown in FIG. 11 by arrows 122. This process is the same as that of the dielectric waveguide device used in the first to ninth embodiment and is described more specifically later. The periodically polarization domain-inverted layer 22 is formed to match phase of the fundamental wave ray to the second harmonic ray.

Figure 12:
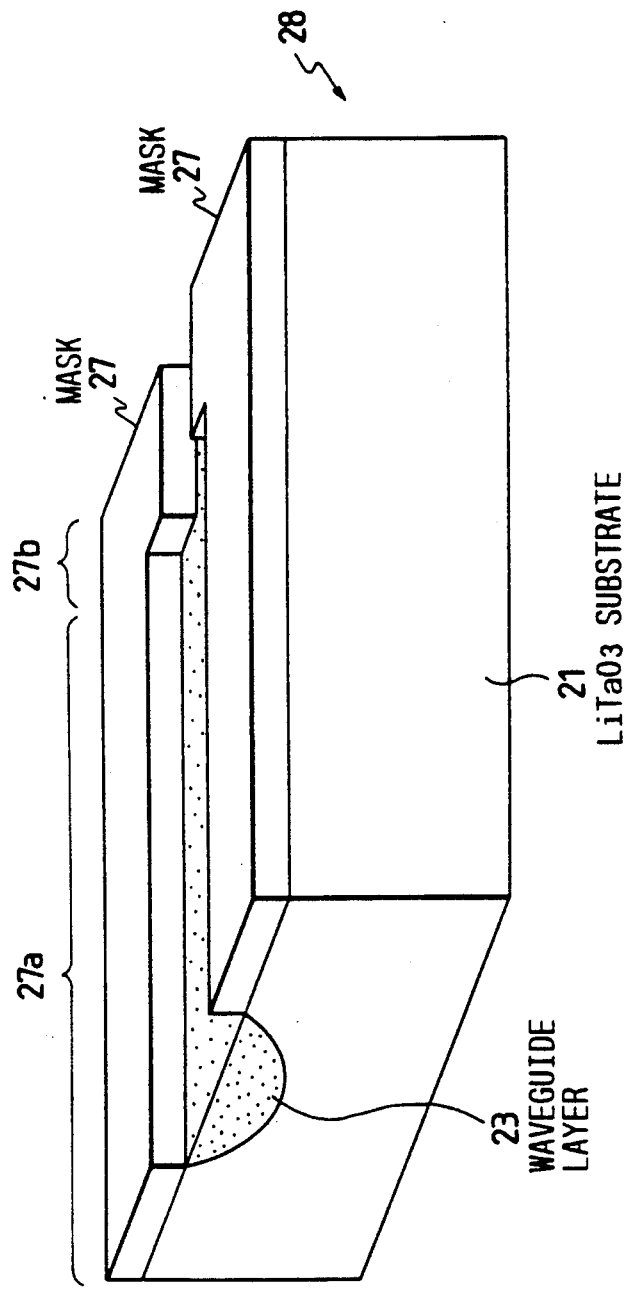
FIG. 12 is a perspective view of the second harmonic device of tenth embodiment under processing.

Then, a proton exchange is effected to the periodically polarization domain-inverted layer 22 with a pyrophosphoric acid to form a waveguide layer 23. In fact, in this processing the output portion 25 for receiving and waveguiding the second harmonic ray is formed at the same time. FIG. 12 is an perspective view of the second harmonic device 28 of tenth embodiment which is covered with masks 27 for illustrating this process. A first portion 27a of each of the masks 27 has a width for providing the waveguide layer 23. A second portion 27b of each of the masks 27 is formed such as to provide a width of the output portion 25 which does not waveguide the fundamental wave ray of the incident light 8 but waveguides second harmonic ray because the fundamental wave ray is radiated at the output portion 25. That is, the output portion 25 has a smaller width than the waveguide layer 23. The output portion 25 is formed by the proton exchange using the masks 27 to have a higher refractive index than the LiTaO$_3$ substrate 21. The width of the output portion 25 is 0.8 $\mu$m.

The periodically polarization domain-inverted layer 22 is not formed at the second harmonic wave guide portion 26 because the second harmonic waveguide portion 26 is covered with Ta during formation of the periodically polarization domain-inverted layer 22. However, the periodically polarization domain-inverted layer 22 can be formed at the second harmonic waveguide portion 26 because the periodically polarization domain-inverted layer 22 is formed only to match phase of the fundamental wave ray to the second harmonic ray.

Laser light 8 from a semiconductor laser 3 (not shown in this drawing) is incident with a inclined angle to prevent the returning of the fundamental wave ray from the second harmonic generation device 28 to the semiconductor laser 3. When an input power of the incident light is 35 mW, the second harmonic generation device 28 outputs a second harmonic ray 40b of 2 mW. On the other hand, an output power of the fundamental wave ray is too small to be measured. In this condition, an experiment shows a relative intensity of noise is −143 dB/Hz which is preferable. This shows that the fundamental waves incident to the second harmonic generation device 28 generates a second harmonic ray in the dielectric waveguide portion 24 having a periodically polarization domain-inverted layer 22 and then, is radiated from the second waveguide portion 26 and does not return to the semiconductor laser 3. An anti-reflection coating can be provided to further reduce an amount of returning fundamental wave ray.

Figure 13:
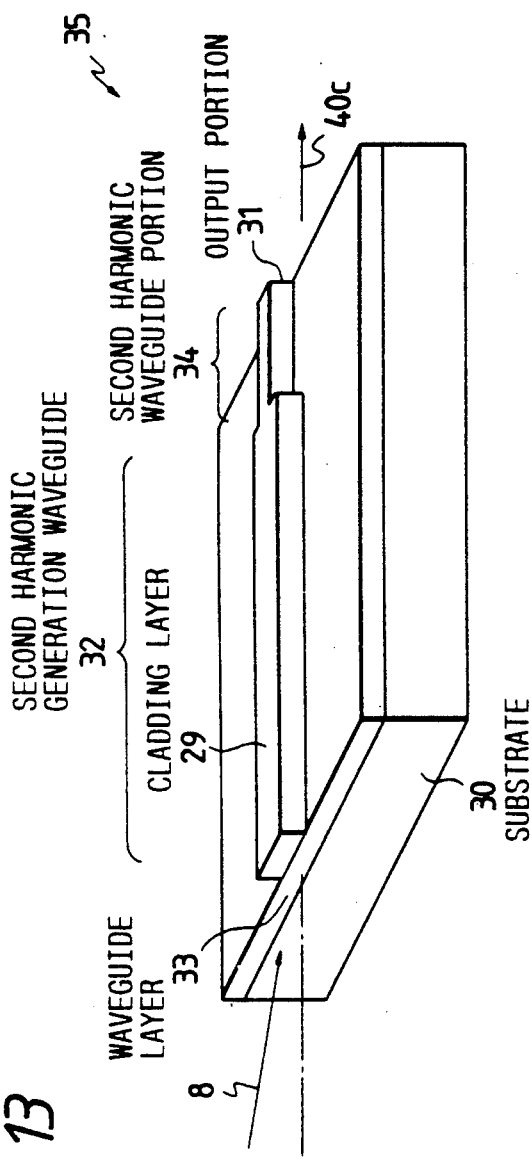
FIG. 13 is a perspective view of a second harmonic generation device of an eleventh embodiment of the invention.

FIG. 13 is a perspective view of a second harmonic generation device 35 of an eleventh embodiment of the invention. In this embodiment, light confinement in the vertical direction of a waveguide is provided by a cladding layer 29 having a higher refractive index than the waveguide layer 33 made of a dielectric non-linear substance. The waveguide layer 33 is deposited on a substrate 30 and then the cladding layer 29 is formed by a well-known semiconductor processing. During the processing of forming the cladding layer 29 having a higher refractive index than the waveguide layer, a second waveguide portion 34 is formed on the output portion 31 of the waveguide layer 33 at the same time. The second harmonic waveguide portion 34 is formed such that a width of the output portion 25 does not waveguide the fundamental wave ray of the incident light 8 but waveguides a second harmonic ray. That is, the second harmonic waveguide portion 34 has a smaller width than the cladding layer 29. In this embodiment, a width of the cladding layer 29 is 4 $\mu$m and that of the second harmonic waveguide portion 34 is 0.8 $\mu$m.

Laser light 8 from a semiconductor laser 3 (not shown in this drawing) is incident with an inclined angle to prevent the returning of the fundamental waves from the second harmonic generation device 35 to the semiconductor laser 3. When an input power of the incident light is 35 mW, the second harmonic generation device 35 outputs a second harmonic ray 40c of 2 mW. On the other hand, an output power of the fundamental wave ray is too small to be measured. In this condition, an experiment shows a relative intensity of noise is −140 dB/Hz which is preferable. This shows that the fundamental waves incident to the second harmonic generation device 35 generates a second harmonic ray 40c in the second harmonic generation waveguide 32 having the cladding layer 29 and is radiated from the second harmonic waveguide portion 34 and does not return to the semiconductor laser 3. An anti-reflection coating can be provided to further reduce an amount of returning fundamental wave ray.

Figure 14:
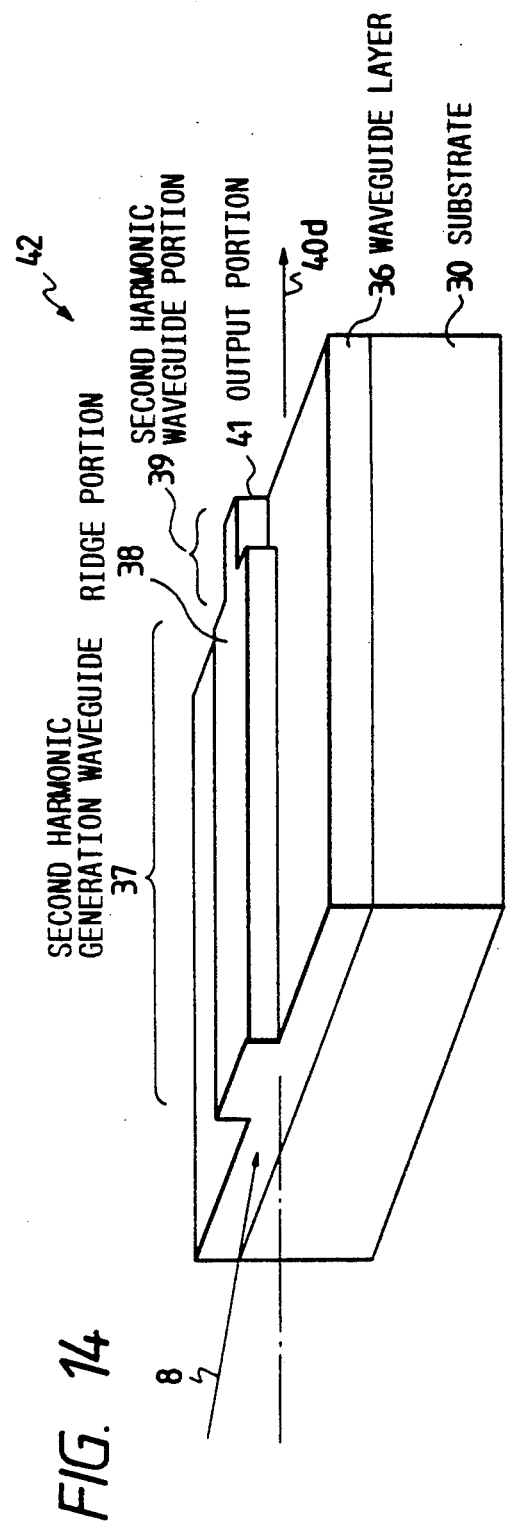
FIG. 14 is a perspective view of a second harmonic generation device of a twelfth embodiment of the invention.

FIG. 14 is a perspective view of a second harmonic generation device 42 of a twelfth embodiment of the invention. In this embodiment, light confinement in the vertical direction of a waveguide made of a dielectric non-linear substance is provided by a ridge type structure by etching the waveguide layer 36 made of dielectric non-linear substance. During forming of the ridge portion 38 a second harmonic waveguide portion 39 is formed such that a width of the output portion 41 does not waveguide the fundamental wave of the incident light 8 but waveguides second harmonics. That is, the second harmonic waveguide portion 39 has a smaller width than the second harmonic generation waveguide 37. In this embodiment, a width of the second harmonic generation waveguide 37 is 3 $\mu$m and that of the second harmonic waveguide portion 39 is 0.7 $\mu$m.

Laser light 8 from a semiconductor laser 3 (not shown in this drawing) is incident with an inclined angle to prevent the returning of the fundamental waves from the second harmonic generation device 42 to the semiconductor laser 3. When an input power of the incident light is 35 mW, the second harmonic generation device 35 outputs a second harmonic ray 40d of 2 mW. On the other hand, an output power of the fundamental wave ray is too small to be measured. In this condition, an experiment shows a relative intensity of noise is $-140$ dB/Hz which is preferable. This shows that the fundamental waves incident to the second harmonic generation device 42 generates a second harmonic ray 40d in the second harmonic generation waveguide 39 having the second harmonic generation waveguide 37 and is radiated from the second harmonic waveguide portion 39 and does not return to the semiconductor laser 3. An anti-reflection coating can be provided to further reduce an amount of returning fundamental wave ray.

Figure 15:
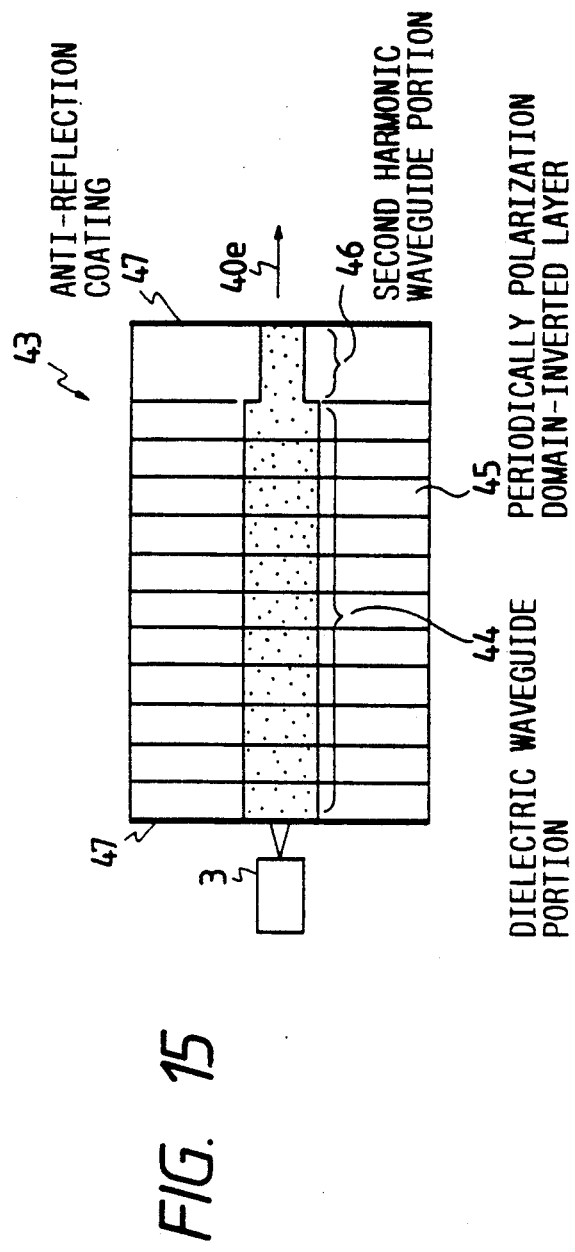
FIG. 15 is a plan view of a second harmonic generation device of thirteenth embodiment.
Figure 16:
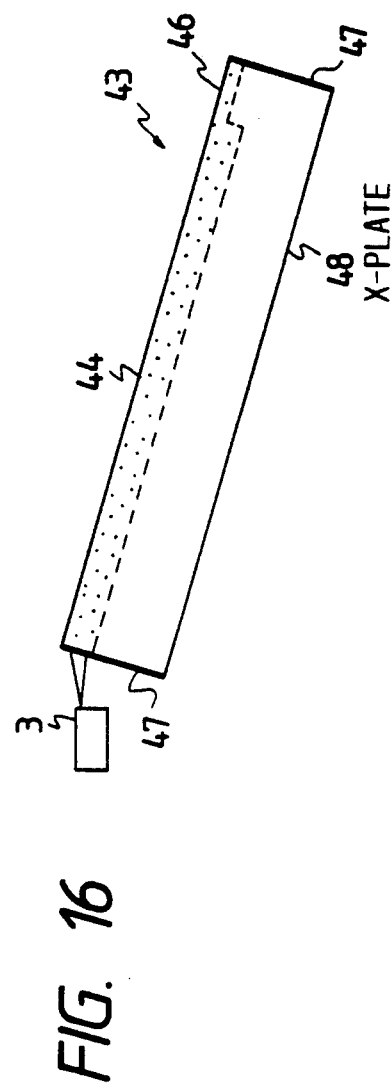
FIG. 16 is a side view of a second harmonic generation device of thirteenth embodiment.

FIG. 15 is a plan view of a second harmonic generation device of thirteenth embodiment. FIG. 16 is a side view of a second harmonic generation device of thirteenth embodiment. In this embodiment, a substrate 48 employing a X-plate of LiTaO$_3$. The X-plate is capable to be directly coupled with to a laser light of TE mode.

The second harmonic generation device 43 comprises a dielectric waveguide portion having the X-plate 48, a periodically polarization domain-inverted layer 44 formed on the X-plate 48 and a second harmonic waveguide portion 46 on the X-plate 48, which does not waveguide the fundamental wave ray. The second harmonic generation device 43 is provided in the same manner as the tenth embodiment using the X-plate 48 of LiTaO$_3$.

The second harmonic generation device 43 is coupled to a semiconductor laser 3 with an inclined angle of approximately six degrees between the optical axis of the second harmonic generation device 43 and the semiconductor laser 3.

Anti-reflection coatings 47 having a reflectivity of less than 0.2% are provided to further reduce an amount of returning fundamental wave ray.

When a drive current for the semiconductor laser 3 is 100 mA, the second harmonic generation device 43 outputs a second harmonic ray 40e of 3 mW of 430 nm. In this condition, an experiment shows a relative intensity of noise is $-143$ dB/Hz measured at 10 MHz, which is preferable.

Figure 17:
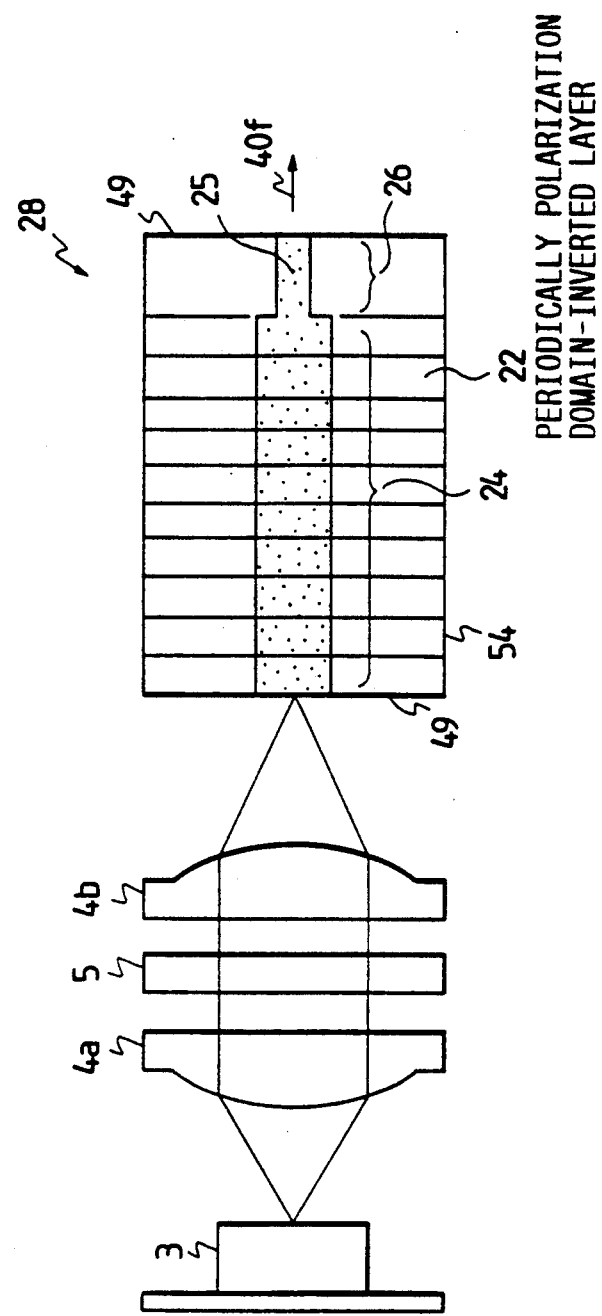
FIG. 17 is a plan view of a fourteenth embodiment of a second harmonic generation apparatus.

FIG. 17 is a plan view of a fourteenth embodiment of a second harmonic generation apparatus. In this embodiment, a substrate 21 of a second harmonic generation device 56 employing a Z-plate of LiTaO$_3$ substrate 21a. The Z-plate is capable to be coupled with to a laser light of TM mode using a half-wave plate 5. That is, the second harmonic generation device 56 is the same one used in the tenth embodiment.

A semiconductor laser 3 emits laser light having a wavelength of 860 nm and is used as a light source of a fundamental wave for generating a second harmonics. The laser light emitted from the semiconductor laser 3 is collected and made a parallel ray by a lens assembly 4a having numerical aperture NA of 0.55. The parallel ray is transmitted through a half wave plate 5. The half-wave plate 5 converts a phase of the parallel ray by 90 degrees to obtain TM mode light. The TM mode light from the half-wave plate 5 is collected by a lens assembly 4b having a numerical aperture NA of 0.6 onto an inlet of a dielectric waveguide portion 24 of the dielectric second harmonic generation device 28 to couple the laser light from the half-wave plate 5 to the dielectric waveguide portion 24. The second harmonic generation device 56 comprises the waveguide layer 23 having a dielectric waveguide portion 24 having the periodically polarization domain-inverted layer and a second harmonic waveguide portion 26 having no periodically polarization domain-inverted layer where the output portion 25 is formed.

The second harmonic generation device 56 is arranged such that a longitude direction of waveguide layer 2 is inclined about six degrees from an optical axis of the semiconductor laser 3, the lens assembly 4a, the half-wave plate 5, and the lens assembly 4b along a plane of a side surface 54 of the second harmonic generation device 28. That is, the dielectric waveguide device 1 is inclined such that a top surface of the waveguide layer disappears from the view from the semiconductor laser 3.

Anti-reflection coatings 49 having a reflectivity of less than 0.2% are provided to further reduce an amount of returning fundamental wave ray.

When a drive current for the semiconductor laser 3 is 100 mA, the second harmonic generation device 28 outputs a second harmonic ray 40f of 2.6 mW of 430 nm. In this condition, an experiment shows a relative intensity of noise is $-142$ dB/Hz measured at 10 MHz, which is preferable.

In the thirteenth and fourteenth embodiment, only second harmonic generation device 28 of the tenth embodiment is used. However, the second harmonic generation devices of the eleventh and twelfth embodiments can be used for the thirteenth and fourteenth embodiment.

Figure 18:
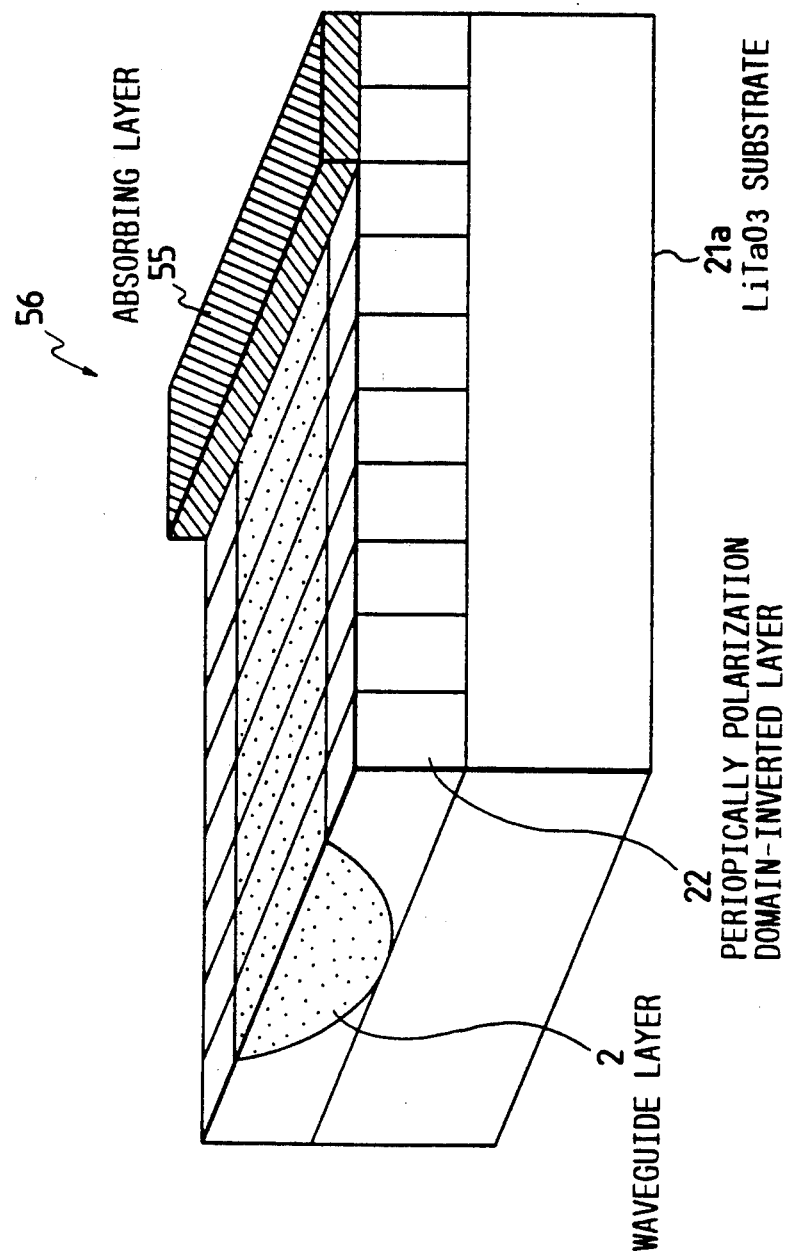
FIG. 18 is a perspective view of a second harmonic generation device provided by a method of the fifteenth embodiment.

Hereinbelow will be described a fifteenth embodiment of a method of producing a second harmonic generation device. FIG. 18 is a perspective view of a second harmonic generation device provided by a method of the fifteenth embodiment. The second harmonic generation device 56 comprises a waveguide layer 2, a periodically polarization domain-inverted layer 22 formed on a LiTaO$_3$ 21 and an absorbing layer 55 formed on the waveguide layer 2 and the periodically polarization domain-inverted layer 22.

At first, processing of forming a periodically polarization domain-inverted layer 22 for phase matching of second harmonic waves to the fundamental waves waveguided in a waveguide layer will be described.

A Ta (tantalum) layer is formed on a LiTaO$_3$ substrate 21 with a stripes-pattern using ordinary photoprocess and dry-etching process. A proton exchange is effected to the surface of the LiTaO$_3$ substrate having the Ta layer at 260° C. for thirty minutes to form proton exchanged layers at portions where the Ta layer is not formed. Then, a heating processing is carried out for one minutes at 550° C. to the work where the proton exchanged layers have been formed to form periodically polarization domain-inverted layers. Then, the Ta layer is removed by wet etching for two minutes with a solution of HF:HFN$_3$=1:1. Then, a proton exchange is effected to the periodically polarization domain-inverted layer with a pyrophoshoric acid to form a waveguide layer. The second harmonic generation device 56 has the periodically polarization domain-inverted layer obtained comprises a waveguide layer 2 having 4 $\mu$m width, 2 $\mu$m depth, and 10 mm length. The periodically polarization domain-inverted layers are periodically formed at every 3.6 $\mu$m length and are formed to have a width of 2.1 $\mu$m and a depth of 1.6 $\mu$m.

Then, the absorbing layer 55 of a thin film made of an optical filter material, for absorbing the fundamental waves, is formed at near an output of the waveguide layer 2 by spattering of an optical filter which absorbs the fundamental wave ray but transmits the second harmonic wave ray. That is, the fundamental wave ray and the second harmonic wave ray enter the absorbing layer 55 because difference in the refractive index is decreased compared with the air. The absorbing layer 55 absorbs the fundamental wave ray but transmits the second harmonic wave ray and reflects it at its top surface. Therefore, the second harmonic wave ray is waveguided by the absorbing layer 55 and the waveguide layer 2.

A method of forming the absorbing layer 55 is method will be described more specifically.

FIGS. 19A to 19D are side views of the second harmonic generation device 56 for showing processing of producing the same.

Figure 19A:
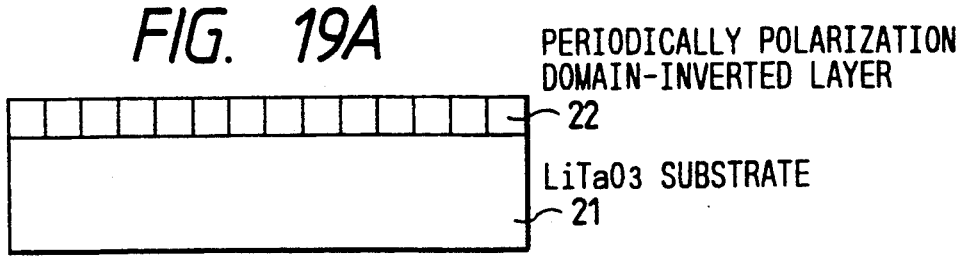
FIGS. 19A to 19D are side views of the second harmonic generation device of the fifteenth embodiment for showing processing of producing the same.
Figure 19B:
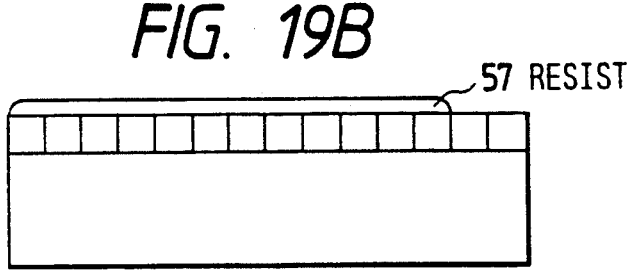
Figure 19C:
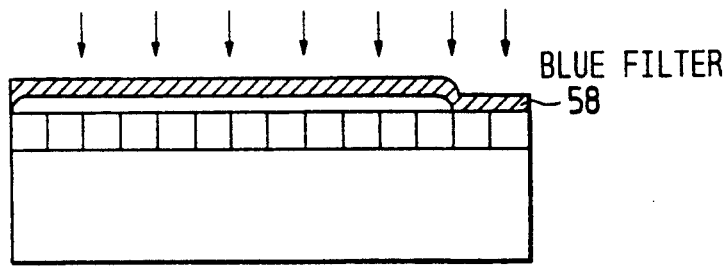
Figure 19D:
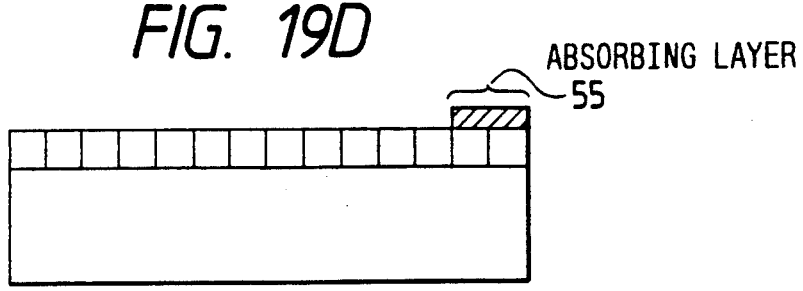

FIG. 19A shows a condition after the processing mentioned above. That is, a periodically polarization domain-inverted layer 22 and the waveguide layer 2 are formed on the LiTaO$_3$ substrate 21. FIG. 19B shows the next condition. That is, a resist 57 is formed on the top surface of the work shown in FIG. 19A except a portion where the absorbing layer 55 will be formed by well-known photolithography technique. In the following step, a well-known RF spattering is effected using a blue filter (HOYA B-460) as a target as shown in FIG. 19C to deposit a blue filter 58 having approximately 5000 A on the work shown in FIG. 19B. During the deposition, a temperature of work shown FIG. 19B is controlled to approximately 170° C. Finally, the absorbing layer 55 is formed by removal of the resist 57 as shown in FIG. 19D. In this embodiment, the blue filter of HOYA B-460 is used. However, other blue filters can be used, for example, a blue filter of B-48S or V-42 manufactured by TOSHIBA corporation can be used. An experiment has been made such that a semiconductor laser is coupled to the second harmonic generation device produced by the method of this embodiment and the laser light is applied to the wave guide layer 2 as a fundamental waves. The second harmonic generation device outputs no fundamental waves in the detective range and only the second harmonic waves stably. The experiment shows a relative intensity of noise is −139 dB/Hz measured at 10 MHz, which is preferable.

Figure 20:
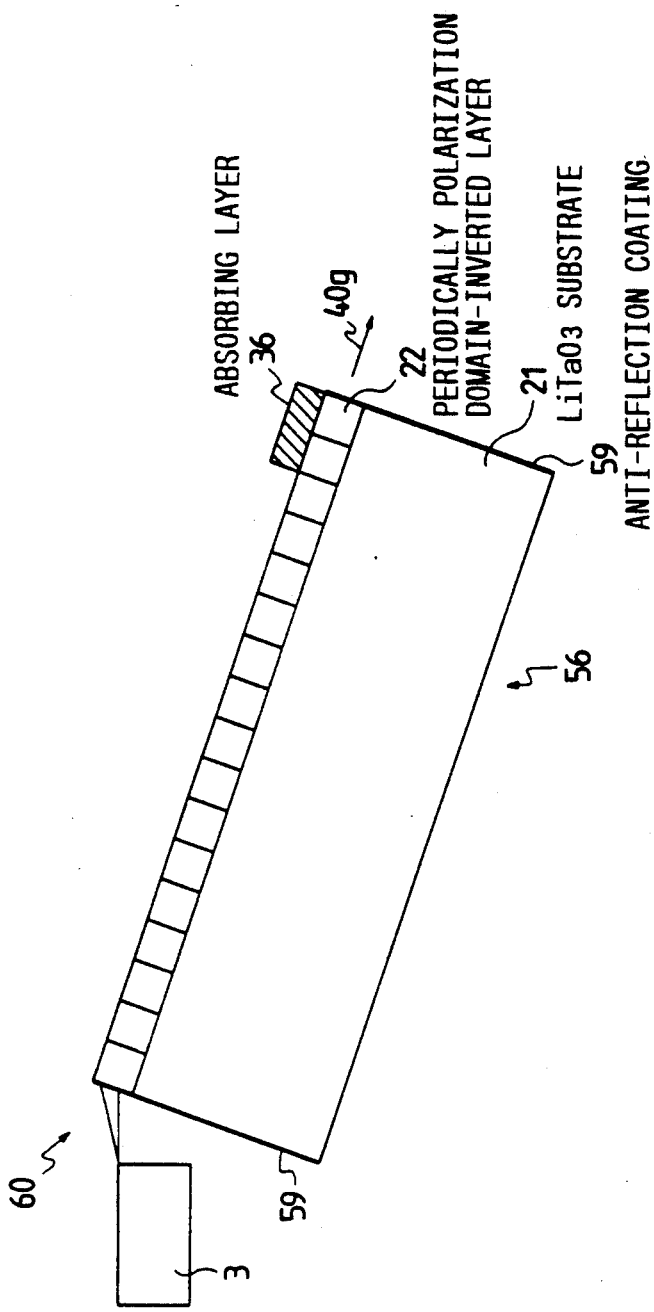
FIG. 20 is a side view of a second harmonic generation apparatus provided by a method of the sixteenth embodiment.

Hereinbelow will be described a sixteenth embodiment of a method of producing a second harmonic generation apparatus. FIG. 20 is a side view of a second harmonic generation apparatus provided by a method of the sixteenth embodiment. The second harmonic generation apparatus 60 comprises a semiconductor laser 3 and a second harmonic generation device 56 having a waveguide layer 2 directly coupled to the semiconductor laser 3, a periodically polarization domain-inverted layer 22 formed on a LiTaO$_3$ 21 and an absorbing layer 55 formed on the waveguide layer 2 and the periodically polarization domain-inverted layer 22. The second harmonic generation device 56 produced by the method of the fifteenth embodiment is directly coupled to the semiconductor laser 3 in the following step to the final step of the fifteenth embodiment. The second harmonic generation device 56 is fixed to have an inclined incident angle of approximate eight degrees and at a position providing a maximum coupling efficiency.

When a drive current for the semiconductor laser 3 is 100 mA, the second harmonic generation device 56 outputs a second harmonic ray 40g of 2.5 mW of 430 nm. In this condition, an experiment shows a relative intensity of noise is −140 dB/Hz measured at 10 MHz, which is preferable.

This invention discloses respective structures or methods for preventing the returning of the fundamental wave ray from the waveguide layer to the semiconductor laser for producing the fundamental wave ray. However, combinations of more than two structure or methods can be carried out.

Hereinbelow will be described the processing of production of the dielectric waveguide devices from the first to ninth embodiments and the tenth embodiment more specifically. The dielectric waveguide device of the tenth embodiment is different from the dielectric waveguide in the shape of the mask 27 and that the periodically polarization domain-inverted layer 22 is not formed around the output portion 25. Other processing is the same as that of the dielectric waveguide devices from the first to ninth embodiments basically.

Figure 21:
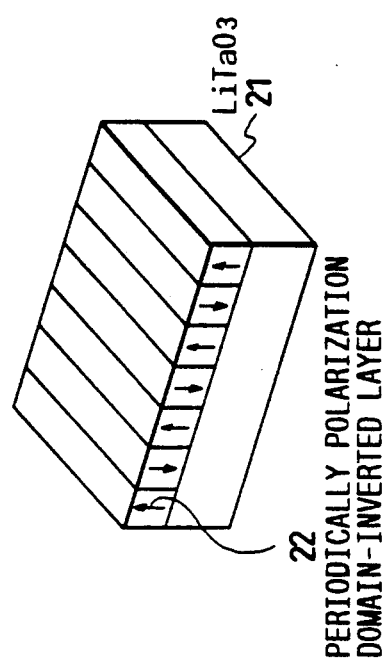
FIG. 21 is a perspective view of the dielectric waveguide device used in the first to ninth embodiment under processing.
Figure 22D:
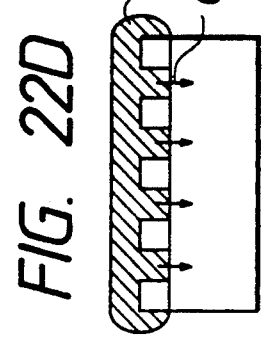
FIGS. 22A to 22F are side views of the dielectric waveguide device 1 showing processing of producing a periodically polarization domain-inverted layer.
Figure 22E:
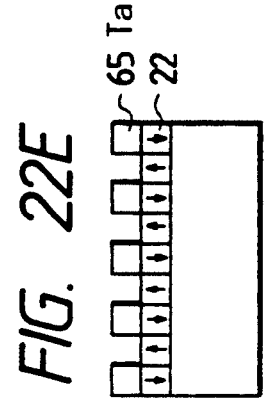
Figure 22F:
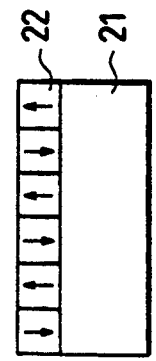

FIG. 21 is a perspective view of the dielectric waveguide device 1 in the condition that a periodically polarization domain-inverted layer 22 is provided. FIGS. 22A to 22F are side views of the dielectric waveguide device 1 showing processing of producing a periodically polarization domain-inverted layer 22. FIGS. 23A to 23D are side views of the dielectric waveguide device 1 showing processing of producing the waveguide layer 2. FIG. 23E is a perspective view of the dielectric waveguide 1 after processing of production. FIGS. 22A to 22F are side views of the dielectric waveguide device 1 in the direction of the arrow D1 in FIG. 23E. FIGS. 23A to 22D are side views of the dielectric waveguide device 1 in the direction of the arrow D2 in FIG. 23E.

Figure 22A:
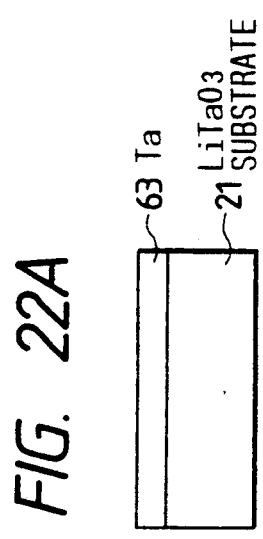
Figure 22B:
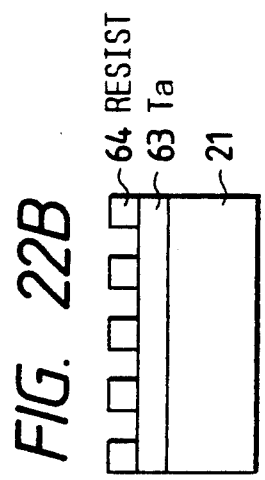
Figure 22C:
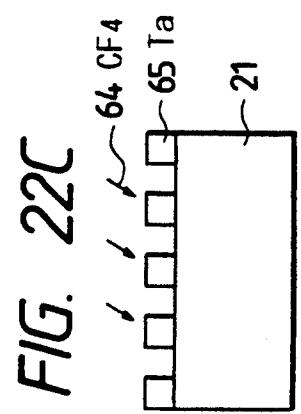
Figure 23A:
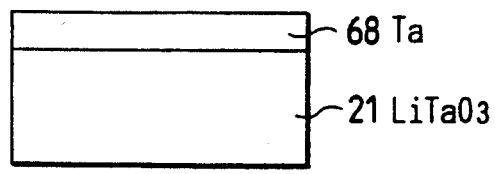
FIGS. 23A to 23D are side views of the dielectric waveguide device showing processing of producing the waveguide layer.

At first, Ta 63 is formed on the LiTaO$_3$ substrate 21 as shown in FIG. 22A. A resist 64 having a strips-pattern is formed by photolithography as shown in FIG. 22B. Then, the work shown in FIG. 22B is dry-etched with CF$_4$ to form a Ta layer 65 having a strips-pattern as shown in FIG. 22C. As shown in FIG. 22D, a pyrophoshoric acid 66 is coated on the top surface of the work shown in FIG. 22C. Then, a heat processing is carried out at 260° C. for thirty minutes to effect proton exchange 67. That is, Li+ in the LiTaO₃ substrate 21 is exchanged with H+. Then, the other heating processing is carried out at 550° C. for one minute as shown in FIG. 22E where the periodically polarization domain-inverted layer 22 is formed. The Ta layer 65 is removed by wet-etching with a solution of HF;HFN₃=1:1 as shown in FIG. 22F and then, annealing is carried out at 400° C. for six hours.

Figure 23B:
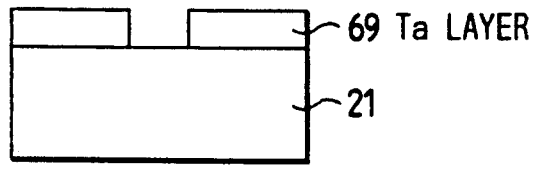
Figure 23C:
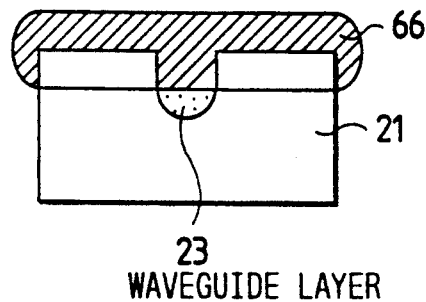
Figure 23D:
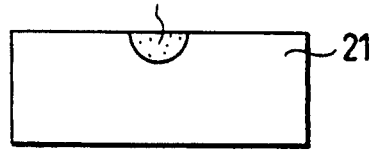
Figure 23E:
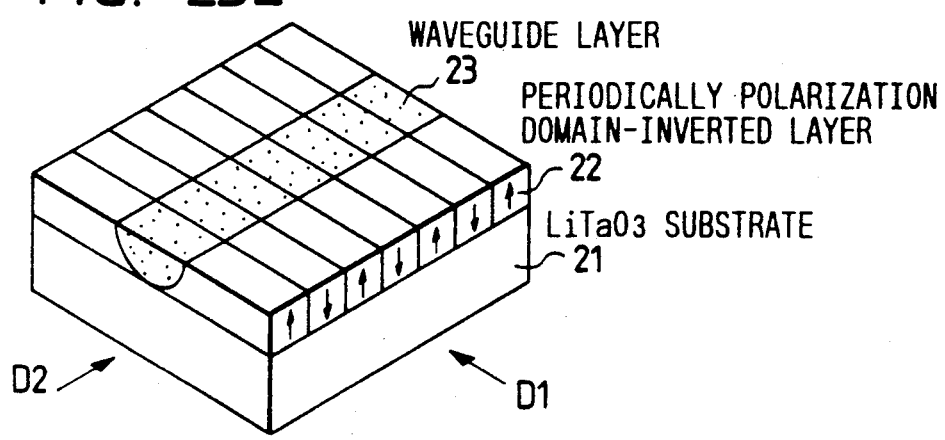
FIG. 23E is a perspective view of the dielectric waveguide 1 after processing of production.

Then, the waveguide layer 2 is formed. At first, Ta 68 is formed again on the LiTaO₃ substrate 21 having the periodically polarization domain-inverted layer 22 as shown in FIG. 23A. A Ta layer 69 is formed by photolithography and dry-etching to have a shape for providing the waveguide layer 2 as shown in FIG. 23B. As shown in FIG. 23C, a pyrophoshoric acid 66 is coated on the top surface of the work shown in FIG. 23B. Then, a heat processing is carried out at 260° C. for four minutes to cause the portion subjected to the proton exchange to have a higher refractive index. That is, Li+ in the LiTaO₃ substrate 21 is exchanged with H+. Then, the Ta layer 69 is removed by wet-etching with a solution of HF;HFN₃=1:1 as shown in FIG. 23D or FIG. 23E.

Figure 24A:
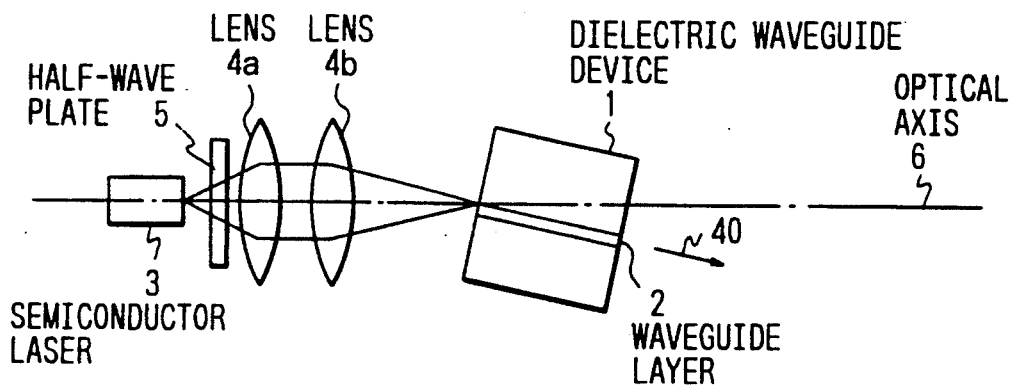
FIGS. 24A to 24C are plane views of second harmonic generation apparatus for showing examples of modification in the optical system.
Figure 24B:
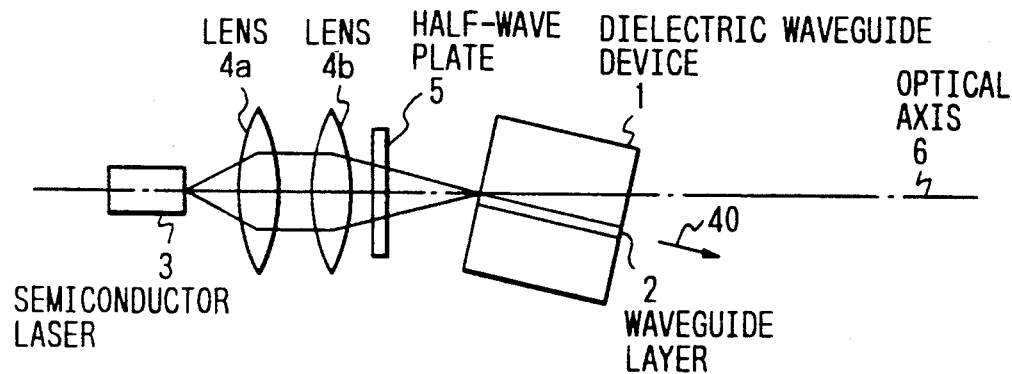
Figure 24C:
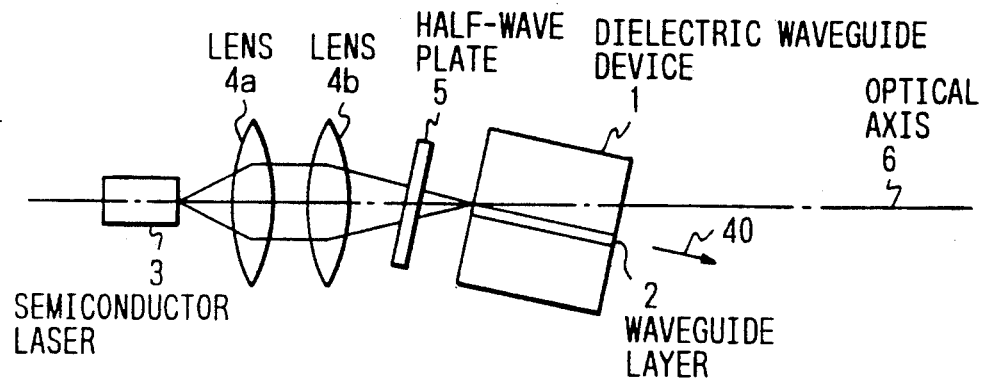

FIGS. 24A to 24C are plane views of second harmonic generation apparatus for showing examples of modification in the optical system. Throughout the embodiments, the half-wave plate 5 is provided between the lens assemblys 4a and 4b. However, it can be provided at any position between the semiconductor laser 3 and the waveguide layer 2. FIGS. 24A and 24B show such modifications where the modifications of the first embodiment are taken as examples. Moreover, throughout the embodiments, the optical axis of the half wave plate 5 agrees with the optical axis of the semiconductor laser 3 and the lens assemblys 4a and 4b. However, the optical axis of the half-wave plate 5 may be agrees with the optical axis to the waveguide layer which is inclined to the semiconductor laser 3. FIG. 24C shows such an example.

What is claimed is:

1. A second harmonic generation device comprising:
   (a) a substrate; and
   (b) a waveguide layer formed on said substrate having first and second portions arranged in a line, said first portion having first and second ends, said first end receiving a fundamental wave ray incident thereto, said first portion waveguiding said fundamental wave ray to said second end, and generating a second harmonic wave ray in response to said fundamental wave ray, and said generated second harmonic wave ray being waveguided to said second end, wherein
   said second portion waveguides and outputs said generated second harmonic ray from said second end of said first portion and said fundamental wave ray is radiated at said second end.

2. A second harmonic generation device as claimed in claim 1, wherein said first portion has a larger width than said second portion, so that said second portion selectively waveguides said second harmonic ray out of said fundamental wave ray and said second harmonic wave ray from said second end of said first portion.

3. A second harmonic generation device as claimed in claim 1, wherein said first portion further comprises a periodically polarization domain-inverted layer for obtaining a phase match between said fundamental wave ray and said second harmonic wave ray waveguided by said first portion.

4. A second harmonic generation device as claimed in claim 3, wherein said first portion has a larger width than said second portion, so that said second portion selectively waveguides said second harmonic ray out of said fundamental wave ray from said second end and said second harmonic wave ray from said second end.

5. A second harmonic generation apparatus comprising:
   (a) a laser for emitting laser light;
   (b) a second harmonic generation device having a substrate and a waveguide layer formed on said substrate; and
   (c) coupling means for coupling said laser light to said waveguide layer, wherein
   said waveguide layer has first and second portions arranged in a line and said first portion has an inlet and outlet, said inlet receiving said laser light incident thereto and said laser light being waveguided to said outlet, and generating in said first portion a second harmonic wave ray in response to said laser light, and said generated second harmonic wave ray being waveguided to said outlet, and
   said second portion waveguides and outputs said generated second harmonic ray from said outlet of said first portion, and said fundamental wave ray is waveguided through said first portion is radiated at said outlet of said first portion.

6. A second harmonic generation apparatus as claimed in claim 5, wherein said coupling means comprises a collimator lens for making said laser light to a collimated light, a half-wave plate for rotating direction of an electric field of said collimated laser light by ninety degrees, and an objective lens for focusing said laser light from said half-wave plate onto said inlet of said waveguide layer.

7. A second harmonic generation apparatus as claimed in claim 5, wherein said coupling means directly couples said laser light to said waveguide layer.

8. A second harmonic generation apparatus as claimed in claim 5, wherein said first portion further comprises a periodically polarization domain-inverted layer for obtaining a phase match between said fundamental wave ray and said second harmonic wave ray.

9. A second harmonic generation apparatus as claimed in claim 8, wherein said first portion has a larger width than said second portion, so that said second portion selectively waveguides said second harmonic ray out of said fundamental wave ray from said outlet and said second harmonic wave ray from said outlet.

10. A second harmonic generation apparatus as claimed in claim 5, wherein said first portion has a larger width than said second portion, so that said second portion selectively waveguides said second harmonic ray out of said fundamental wave ray from said outlet and said second harmonic wave ray from said outlet.

11. A second harmonic generation device comprising:
   (a) a substrate; and
   (b) a waveguide layer formed on said substrate having first and second portions, wherein
   said first portion waveguides a fundamental wave ray incident thereto, generates a second harmonic wave ray in response to said fundamental wave ray and waveguides said generated second harmonic wave ray, said first portion further comprising a periodically polarization domain-inverted layer to obtain a phase match between said fundamental wave ray and said second harmonic wave ray, and said second portion waveguides and outputs said generated second harmonic ray from said first portion and radiates said fundamental wave ray.

12. A second harmonic generation apparatus comprising:
(a) a laser for emitting laser light;
(b) a second harmonic generation device having a substrate and a waveguide layer formed on said substrate; and
(c) coupling means for coupling said laser light to said waveguide layer, wherein said waveguide layer has first and second portions, said first portion waveguides said laser light incident thereto, generates a second harmonic wave ray in response to said laser light, and waveguides said generated second harmonic wave ray, said first portion further comprising a periodically polarization domain-inverted layer to obtain a phase match between said incident laser light and said second harmonic wave ray, and said second portion waveguides and outputs said generated second harmonic ray from said first portion and radiates said incident laser light.

13. A second harmonic generation apparatus as claimed in claim 12, wherein said coupling means comprises:

a collimator lens for making said laser light to a collimated light, a half-wave plate for rotating direction of an electric field of said collimated laser light by ninety degrees, and an objective lens for focusing said laser light from said half-wave plate onto said first portion of said waveguide layer.

* * * * *